United States Patent [19]
Yano et al.

[11] Patent Number: 5,529,693
[45] Date of Patent: Jun. 25, 1996

[54] METHOD AND APPARATUS FOR TREATING WATER CONTAINING ORGANIC SULFUR COMPOUNDS

[75] Inventors: Takahiro Yano, Gose; Toshiaki Muratani, Yamatokoriyama; Hiroyuki Chifuku, Hyogo; Yoshio Takamura, Osaka, all of Japan

[73] Assignees: Sharp Kabushki Kaisha, Osaka; Shinko Pantec Co., Ltd., Kobe, both of Japan

[21] Appl. No.: 407,672

[22] Filed: Mar. 21, 1995

[30]     Foreign Application Priority Data

Mar. 29, 1994 [JP] Japan ................................ 6-059333

[51] Int. Cl.6 ............................................................ C02F 3/02
[52] U.S. Cl. ......................... 210/614; 210/621; 210/631; 210/195.1; 210/205
[58] Field of Search .................................. 210/614, 620, 210/621, 622, 624, 631, 194, 195.1, 202, 205, 209, 220, 259, 743

[56]     References Cited

U.S. PATENT DOCUMENTS

| | | | |
|---|---|---|---|
| 2,642,394 | 6/1953 | Paulette et al. | 210/195.1 |
| 3,429,806 | 2/1969 | Carter et al. | 210/621 |
| 3,964,998 | 6/1976 | Bernard | 210/621 |
| 5,196,111 | 3/1993 | Nicol et al. | 210/195.1 |
| 5,252,214 | 10/1993 | Lorenz et al. | 210/622 |

*Primary Examiner*—Christopher Upton
*Attorney, Agent, or Firm*—Oblon, Spivak, McClelland, Maier & Neustadt

[57]     ABSTRACT

A method for treating water containing organic sulfur compounds comprises adjusting the pH value of the water in a pH adjustment tank, biologically treating the water in a biological treatment tank, adjusting the pH value of the water to be alkaline at any places in the biological treatment tank, maintaining the dissolved oxygen concentration of the water to 2 mg/L or higher at any places in the biological treatment tank, and supplying a part of the water to the pH adjustment tank for a further treatment. An apparatus for carrying out the above method is also provided.

6 Claims, 4 Drawing Sheets

METHOD AND APPARATUS FOR TREATING WATER CONTAINING ORGANIC SULFUR COMPOUNDS

BACKGROUND OF THE INVENTION

1. Field of the Invention

This invention relates to a method and an apparatus for treating water containing organic sulfur compounds, and more particularly, a method for biologically decomposing water such as wastewater containing organic sulfur compounds such as dimetyl sulfoxido (DMSO), etc., while suppressing offensive odor, and an apparatus for carrying out such decomposition.

2. Description of the Prior Art

Referring to FIG. 4, a conventional apparatus of this type comprises a storage tank 1a storing raw water as water to be treated, a pH adjustment tank 2a for adjusting the pH value of the water fed from the storage tank 1a, a biological treatment tank 8a for biologically treating the water whose pH value is adjusted by the pH adjustment tank 2a, and a precipitation tank 15a to which the water treated at the biological treatment tank 8a is supplied.

The pH adjustment tank 2a includes a pH measuring instrument 3a for measuring the pH value in the pH adjustment tank 2a, an alkali pump 4a as an alkali supplying means for supplying alkaline liquid into the pH adjustment tank 2a, and a controller 6a for controlling the volume of the alkaline liquid supplied by the alkali pump 4a in accordance with the pH value measured by the pH measuring instrument 3a.

In the apparatus of this arrangement, after the water is temporarily stored in the storage tank 1a, the alkaline liquid is added to the pH adjustment tank 2a to a predetermined pH value, and then, is supplied to the biological treatment tank 8a.

The water is subjected to oxidation decomposition by microorganisms, as the water flows down to an effluent end side in the biological treatment tank 8a. Oxygen required for microorganisms is successively fed by an aerator installed in the biological treatment tank 8a.

The water treated in the biological treatment tank 8a is separated into sludge containing microorganisms and the treated water in the precipitation tank 15a, and the sludge settled in the precipitation tank 15a is returned to the biological treatment tank 8a or withdrawn outside the system.

However, in case of treating the water with such conventional treatment apparatus, following problems are caused.

(1) At an inlet of the biological treatment tank, the concentration of the organic sulfur compounds increases.

Of organic sulfur compounds, DMSO, etc. adversely affect to organisms, when the substrate concentration thereof exceeds a certain level, lowers the decomposition speed and removal rate of organic sulfur compounds, halts progress of the decomposition, and generates methyl sulfide, methylmercaptan and the like which are component of offensive odor.

(2) Organic sulfur compounds gradually decompose as they flow down in the biological treatment tank, and sulfuric ions are proportionally formed. Accordingly, the concentration of sulfuric ions gradually becomes high towards an outlet of the biological treatment tank.

When organic sulfur compounds of a high concentration are biologically decomposed, since the concentration of sulfuric ions generated is relatively high at the outlet, it is difficult to add, at an inlet of the biological treatment tank, alkali which will become necessary at the outlet of the biological treatment tank for neutralization of sulfuric ions, while properly maintaining the pH value in the overall biological treatment tank.

The decomposition speed and removal rate of organic sulfur compounds are lowered due to the lowering of the pH value. As a result, progress of decomposition is halted, and offensive odor component, such as methyl sulfide and methylmercaptan are generated.

(3) During organic sulfur compounds are biologically treated, not only carbon and hydrogen, but also sulfur must be oxidized. Subsequently, the required oxygen volume increases, possibly resulting in shortage of dissolved oxygen in the biological treatment tank.

Once reducing atmosphere is formed by the shortage of dissolved oxygen, methyl sulfide, methylmercaptan and the like of offensive odor component are generated.

(4) When the microorganisms are overloaded with organic sulfur compounds, diffusion and penetration of oxygen to activated sludge floc, a biological membrane and the like do not take place satisfactorily, resulting in the generation of odor components, such as methyl sulfide and methylmercaptan, in the similar manner as Item (3).

SUMMARY OF THE INVENTION

In view of such problems of the prior art, a primary object of the present invention is to suppress generation of offensive odor arising from compounds containing organic sulfur.

The above object of the present invention can be accomplished by providing a method for treating water containing organic sulfur compounds comprising adjusting the pH value of the water in a pH adjustment tank, biologically treating the water in a biological treatment tank, adjusting the pH value of the water to be alkaline at any places in the biological treatment tank, maintaining the dissolved oxygen concentration to 2 mg/L or higher at any places in the biological treatment tank, and supplying a part of the water to the pH adjustment tank for a further treatment. In this case, the water at any places in the biological treatment tank 8 has a pH value preferably in the range from 7 to 9.

The present invention also provides an apparatus for treating water containing organic sulfur compounds including a pH adjustment tank for adjusting the pH value of the water, a biological treatment tank for biologically treating the water after the pH adjustment, the biological treatment tank being provided with a pH adjusting means for adjusting the pH value of the water to be alkaline at any places in the biological treatment tank and a dissolved-oxygen-concentration adjusting means for maintaining dissolved oxygen concentration of the water at any places in the biological treatment tank to 2 mg/L or higher, and a passage for recirculating a part of the water treated in the biological treatment tank to the pH adjustment tank.

An example of the pH adjusting means for adjusting the pH value in the biological treatment tank includes a combination of a pH measuring instrument for measuring the pH value in the biological treatment tank or the pH value in the passage of the water discharged from the biological treatment tank, an alkali supplying means such as an alkali pump for supplying alkaline liquid to the biological treatment tank, and a controller for controlling the volume of the alkaline liquid supplied by the alkali supplying means in accordance with the pH value measured by the pH measuring instrument.

An example of the dissolved-oxygen-concentration adjusting means for adjusting the dissolved oxygen concentration includes an air feeding means for allowing air to flow into the biological treatment tank.

In addition, in place of the above means, it is possible to employ a mechanical aerator for agitating the water in the biological treatment tank as the dissolved-oxygen-concentration adjusting means. It is also possible to employ a combination of the air feeding means and the mechanical aerator as the dissolved-oxygen-concentration adjusting means.

In case of using the apparatus of the above arrangement, first, the pH value of the water containing organic sulfur compounds is adjusted by the pH adjustment tank, and then the water is biologically treated in the biological treatment tank. In this case, since the pH adjusting means is provided to adjust the pH value of the water at any places in the biological treatment tank to be alkaline, even if sulfuric ions are generated when organic sulfur compounds are decomposed in the biological treatment tank, the pH value is adjusted to be alkaline by the pH adjusting means.

The dissolved-oxygen-concentration adjusting means provided for maintaining the dissolved oxygen concentration at any places in the biological treatment tank to 2 mg/L or higher can prevent shortage of dissolved oxygen, even if the required oxygen concentration increases due to not only carbon, hydrogen, and nitrogen but also sulfur being oxidized. Thus, the generation of methyl sulfide or methylmercaptan can be avoided.

On the other hand, since the passage is provided to recirculate a part of the water treated in the biological treatment tank to the pH adjustment tank, the pH value is fully adjusted by supplying the biologically treated water again to the pH adjustment tank via the passage, even if the pH value in the biological treatment tank is not properly adjusted by the pH adjusting means.

The above, and other objects, features and advantages of the present invention will become apparent from the detailed description thereof read in conjunction with the accompanying drawings.

DETAILED DESCRIPTION OF THE PREFERRED EMBODIMENTS

First Embodiment

This embodiment shows one embodiment of a method and an apparatus for treating water containing organic sulfur compounds, and at first, an arrangement of the apparatus will be described herein.

Figure 1:
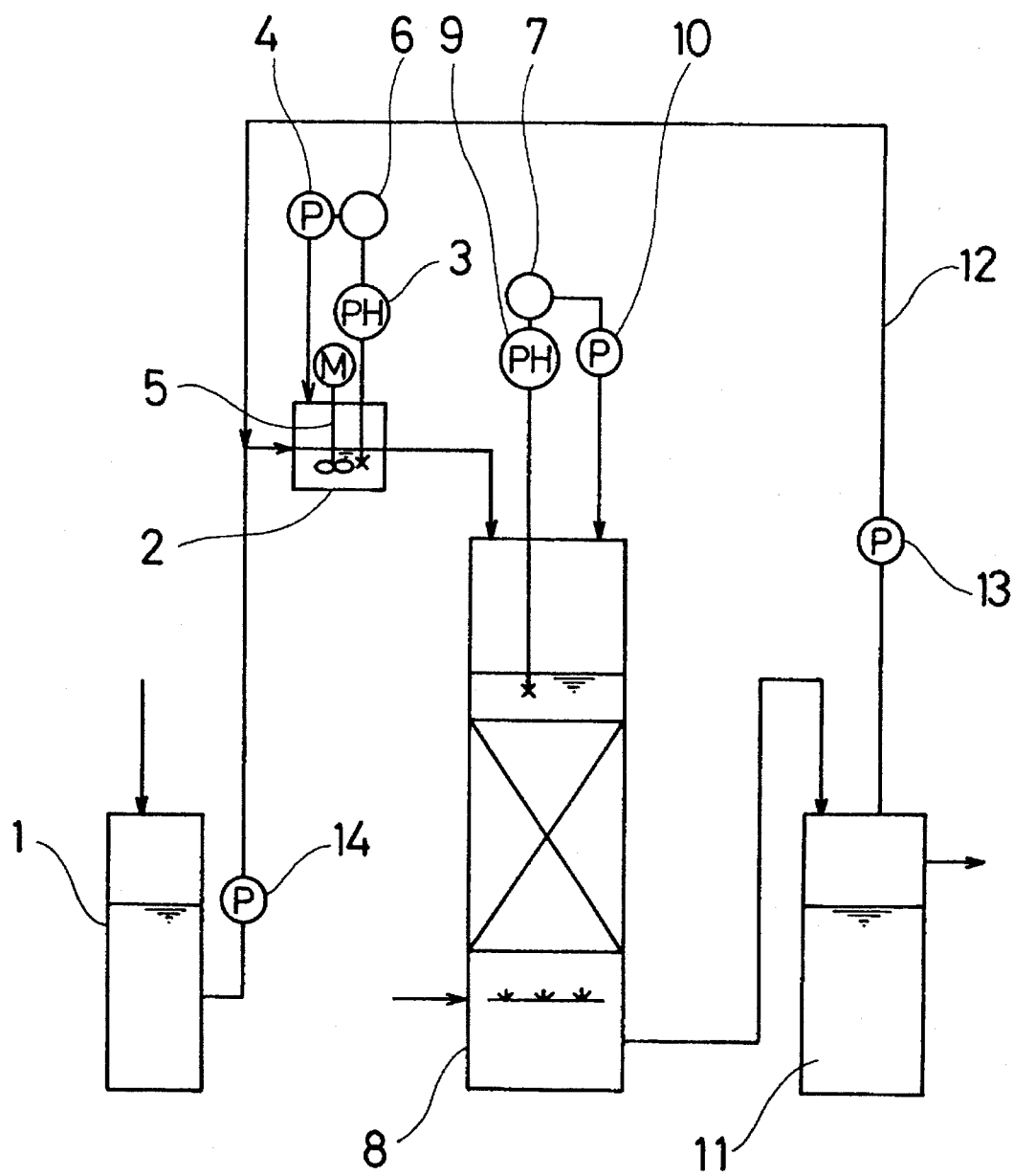
FIG. 1 is a block schematic diagram of an apparatus for treating water containing organic sulfur compounds in accordance with one embodiment of the present invention.

Referring to FIG. 1, the apparatus is provided with a storage tank 1 for storing raw water as water to be treated, and a pH adjustment tank 2 for adjusting the pH value of the water supplied from the storage tank 1. The pH adjustment tank 2 is, in turn, provided with a pH measuring instrument 3 for measuring the pH value of the water in the pH adjustment tank 2, an alkali pump 4 as an alkali supplying means for supplying alkaline liquid into the pH adjustment tank 2, a controller 6 for controlling the volume of the alkaline liquid supplied by the alkali pump 4 in accordance with the pH value measured by the pH adjustment instrument 3, and an agitator 5 for agitating the water in the pH adjustment tank 2.

A biological treatment tank 8 of a fixed bed type for biologically treating the water with its pH value adjusted in the pH adjustment tank 2, is provided with a pH measuring instrument 9 for measuring the pH value of the water in the biological treatment tank 8, an alkali pump 10 as the alkali supplying means for supplying alkaline liquid into the biological treatment tank 8, and a controller 7 for controlling the volume of the alkaline liquid supplied by the alkali pump 10 in accordance with the pH value measured by the pH measuring instrument 9.

In addition, an air diffuser (not shown) is connected to a pipe (not shown) which is, in turn, connected to a lower portion of the biological treatment tank 8 for allowing air to flow into the biological treatment tank 8.

A treated water tank 11 is provided to separate the water treated at the biological treatment tank 8 into two, one being discharged to the outside and the other being recirculated to the pH adjustment tank 2 via a passage 12 which is connected to the treated water tank 11 and the pH adjustment tank 2.

Pumps 13 and 14 are provided in the passage 12 between the treated water tank 11 and the pH adjustment tank 2, and between the storage tank 1 and the pH adjustment tank 2 respectively.

Next discussion will be made on a method for treating the water containing organic sulfur compounds, using the apparatus of the above arrangement.

First, the raw water as water to be treated, which is stored in the storage tank 1, is supplied to the pH adjustment tank 2, and the pH value of the water supplied to the pH adjustment tank 2 is measured with the pH measuring instrument 3 provided to the pH adjustment tank 2. Then, the controller 6 operates the alkali pump 4, at the same time of controlling the volume of the alkaline liquid from the alkali pump 4 in accordance with the measured pH value to properly add the alkaline liquid from the alkali pump 4 into the pH adjustment tank 2. Thus, the pH value of the water in the pH adjustment tank 2 is adjusted.

Then, the water with its pH value adjusted in the pH adjustment tank 2 is supplied to the biological treatment tank 8, in which organic sulfur compounds and the like are biologically treated, that is, decomposed by microorganisms.

In this event, the pH value of the water supplied into the biological treatment tank 8 is first measured with the pH measuring instrument 9 provided to the biological treatment tank 8. In accordance with the measured pH value, the controller 7 operates the alkali pump 10 and controls the volume of the alkaline liquid from the alkali pump 10 to thereby properly add the alkaline liquid from the alkali pump 10 into the biological treatment tank 8. Thus, the pH value of the water in the biological treatment tank 8 is adjusted to be alkaline.

By adjusting the pH value of the water in the biological treatment tank to be alkaline, even when sulfuric ions are generated at the time of decomposing organic sulfur componds in the water in the biological treatment tank 8, the lowering of the pH value can be prevented. The water in the biological treatment tank 8 has a pH value preferably in the range from 7 to 9, thereby reducing variation of the pH value in the biological treatment tank 8.

On the other hand, air is allowed to flow into the biological treatment tank 8 via the pipe (not shown) connected to the bottom of the biological treatment tank 8, and the air diffuser (not shown).

With this flowing air, the dissolved oxygen concentration at any places in the biological treatment tank 8 is maintained to a predetermined value or higher. In this embodiment, the dissolved oxygen concentration can be maintained to 2 mg/L or higher.

The water biologically treated in the biological treatment tank 8 in this manner is supplied to the treated water tank 11, from which the water is discharged outside as well as supplied to the pH adjustment tank 2 via the passage 12.

The water fed from the storage tank 1 is diluted by circulating the water from the treated water tank 11 to the pH adjustment tank 2, thereby lowering the concentration of organic sulfur compounds at an inlet of the biological treatment tank 8, and consequently alleviating obstruction based on the concentration of residual organic sulfur compounds. In addition, variation of the pH value in the biological treatment tank 8 can be reduced by circulating the water to the pH adjustment tank 2, with the result that the pH adjustment is securely carried out.

Second Embodiment

Another embodiment of a method and an apparatus of water containing organic sulfur compounds will be discussed herein.

In this embodiment, a plug flow type is used instead of the fixed bed type used in the first embodiment for the biological treatment tank.

Figure 2:
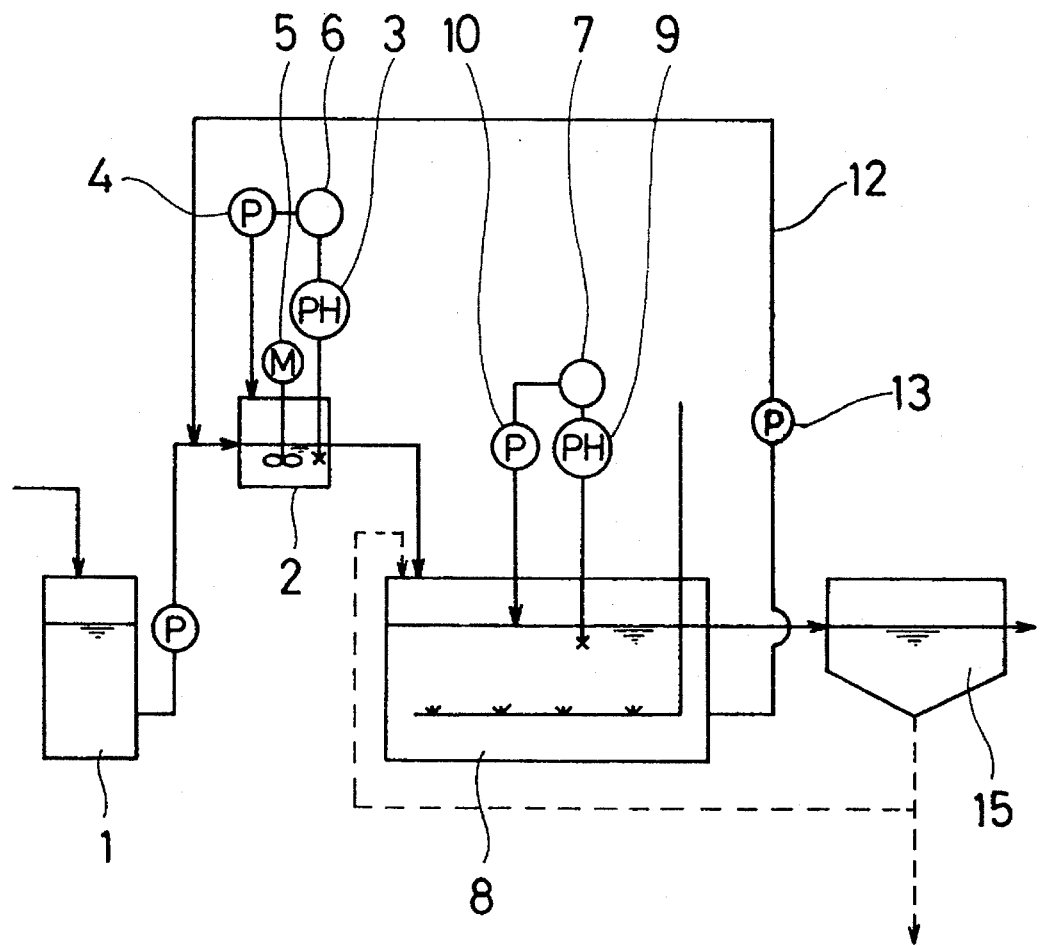
FIG. 2 is a block schematic diagram of an apparatus in accordance with a further embodiment of the present invention.
Figure 3:
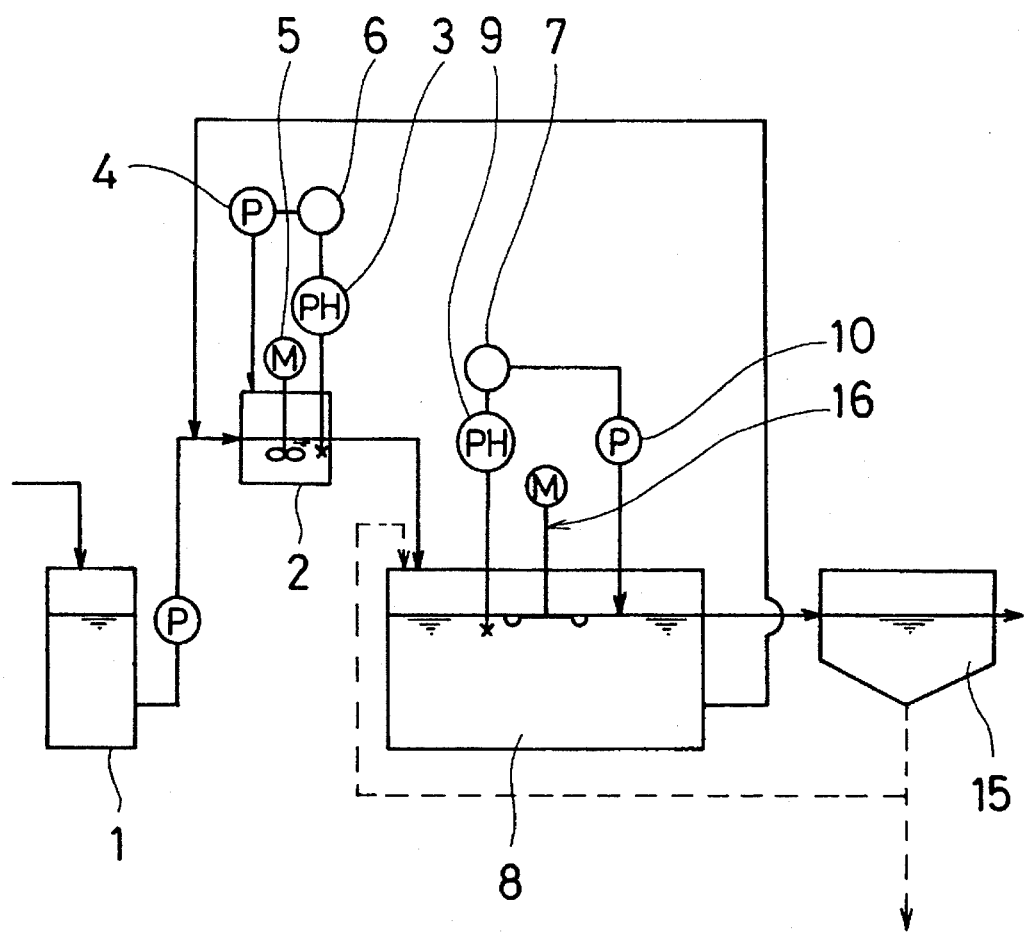
FIG. 3 is a block schematic diagram of an apparatus in accordance with another embodiment of the present invention.
Figure 4:
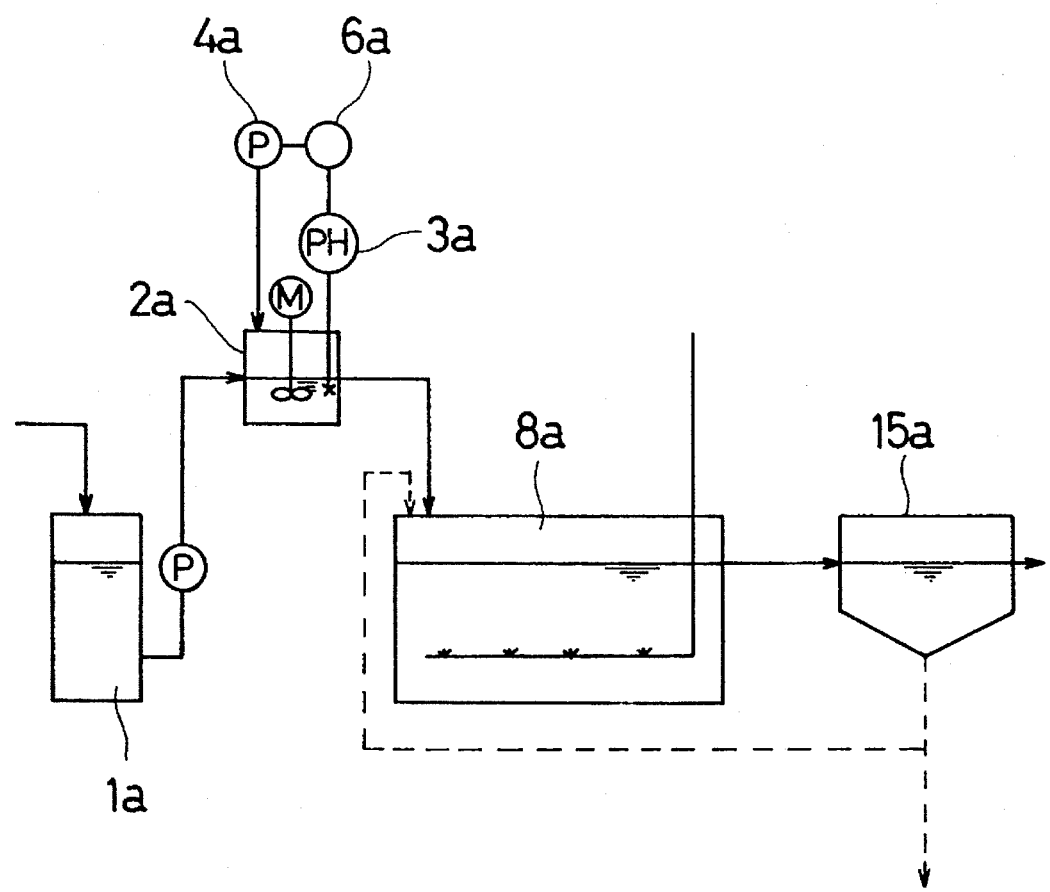
FIG. 4 is a block schematic diagram of a conventional apparatus.

Referring to FIG. 2, a precipitation tank 15, which separates the water treated in the biological treatment tank 8 into supernatant liquid and sludge, is installed in place of the treated water tank 11 as used in the first embodiment. That is, in this embodiment, the sludge settled and separated in the precipitation tank 15 is supplied again to the biological treatment tank 8 to reutilize microorganisms contained in the sludge. In this embodiment, air is supplied to the biological treatment tank 8 from a lower portion thereof to maintain the dissolved oxygen concentration. In addition, the passage 12, through which the water treated in the biological treatment tank 8 returns and circulates to the pH adjustment tank 2, is connected to the biological treatment tank 8 and the pH adjustment tank 2 in this embodiment.

Since other elements are the same as those of the first embodiment, the detailed description thereof will be omitted.

In the method for treating the water containing organic sulfur compounds of this embodiment as well, the raw water as the water to be treated, stored in the storage tank 1 is first supplied to the pH adjustment tank 2, in which the pH value is adjusted, and then the water is supplied to the biological treatment tank 8 for the decomposition of organic sulfur compounds.

Then, the water is biologically treated in the biological treatment tank 8, and supplied to the precipitation tank 15, where the water is separated into supernatant liquid and sludge. The supernatant liquid is discharged outside, while the microorganisms settled and separated in the precipitation tank 15 are either returned to the biological treatment tank 8 or withdrawn to the outside of the system. A part of the water in the biological treatment tank 8 is supplied to the pH adjustment tank 3 via the pump 13 and the passage 12.

In this embodiment as well, variation of the pH value in the biological treatment tank 8 is reduced, while the dissolved oxygen concentration at any places in the biological treatment tank 8 is maintained at a predetermined value. In addition, the raw water as the water to be treated, fed from the storage tank 1 is diluted with the water circulated from the treated water tank 11 to the pH adjustment tank 2 to lower the concentration of organic sulfur compounds at the inlet of the biological treatment tank 8, and consequently alleviating obstruction based on the concentration of the residual organic sulfur compounds. Thus, the pH value in the biological treatment tank 8 is stabilized.

Third Embodiment

The biological treatment tank of a perfect mixing type is used in this embodiment.

An arrangement in accordance with this embodiment is different from those of the aforementioned embodiments in that a mechanical aerator 16 for aerating and agitating the water in the biological treatment tank 8 as the dissolved-oxygen-concentration adjusting means is provided to the biological treatment tank 8, in addition to the pH measuring instrument 9, the alkali pump 10 and the controller 7 of the first and second embodiments.

The aerating and agitating the water in the biological treatment tank 8 with the mechanical aerator 16 of this kind reduces variation of the dissolved oxygen concentration at any places in the biological treatment tank 8. Accordingly, an advantage of this embodiment resides in the fact that variation of the pH value due to the operation of the pH measuring instrument 9, the alkali pump 10, etc., is further reduced and the dissolved oxygen concentration is more properly maintained.

Since other elements of this embodiment are the same as those of the second embodiment, the detailed description thereof will be omitted.

In addition, since the treating method of the water containing organic sulfur compounds is the same as that of the second embodiment except for the aerating and agitating step carried out by the mechanical aerator 16 in the biological treatment tank 8, the detailed description will be omitted.

Test example

Testing was conducted in order to compare the generation concentration of each odor component when the dissolved oxygen concentration is maintained to 2 mg/L or higher by feeding air as described in the first embodiment, with the generation concentration of each odor component when the dissolved oxygen concentration is less than 2 mg/L. The results are shown in Table 1.

TABLE 1

| Dissolved Oxygen Concentration | Methylmercaptan (mg/L) | Methyl sulfide (mg/L) |
|---|---|---|
| 2 mg/L or higher | 0.0012 | 0.009 |
| less than 2 mg/L | 0.0076 | 1.1 |

As is apparent from Table 1, the generation concentration of methylmercaptan can be suppressed to about ⅙ or lower and methyl sulfide to about 1/120 or less at the dissolved oxygen concentration of 2 mg/L or higher, as compared to when it is less than 2 mg/L.

Other embodiments

In the above embodiments, the raw water as the water to be treated, is supplied to the pH adjustment tank after it is once stored in the storage tank 1. However, it is possible to directly supply wastewater discharged from a plant or the like to the pH adjustment tank 2 without storing in the storage tank 1.

In the above embodiments, as the pH adjusting means for adjusting the pH value in the pH adjustment tank 2, the combination of the pH measuring instrument 3 for measuring the pH value of the water in the pH adjustment tank 2, the alkali pump 4 as the alkali supplying means for supplying the alkaline liquid into the pH adjustment tank 2, and the controller 6 for controlling the volume of the alkaline liquid supplied by the alkali pump 4 in accordance with the pH value measured by the pH measuring instrument 3, is employed. However, it is not necessary to limit the pH adjusting means for adjusting the pH value inside the pH adjustment tank 2 to this combination.

In addition, as the pH adjusting means for adjusting the pH value of the water at any places in the biological treatment tank 8 to be alkaline, the combination of the pH measuring instrument 9 for measuring the pH value of the water in the biological treatment tank 8, the alkali pump 10 as the alkali supplying means for supplying the alkaline liquid to the biological treatment tank 8, and the controller 7 for controlling the volume of the alkaline luquid supplied by the alkali pump 10 in accordance with the pH value measured by the pH measuring instrument 9, is employed in the above embodiments. However, it is not necessary to limit the pH adjusting means for adjusting the pH value in the biological treatment tank 8 to this combination.

The number of the pH measuring instrument 9, controller 7, alkali pump 10, etc. are also not limited to the specific embodiments thereof.

Further, in the above embodiments, the pH adjusting means for adjusting the pH value, comprising the pH measuring instrument 9, the controller 7 and the alkali pump 10 is provided to the biological treatment tank 8 such that the pH value inside the biological treatment tank 8 is measured. However, it is not necessary to limit a place to which the pH adjusting means is provided. It may be provided in a passage of the water discharged from the biological treatment tank 8 to measure the pH value of the water in this passage.

It is essential to provide the pH adjusting means which measures the pH value in the biological treatment tank 8 or in the passage of the water discharged from the biological treatment tank 8 and which adjusts the pH value of the water at any places in the biological treatment tank 8 to be alkaline.

In this event, it is essential that the pH value is adjusted to be alkaline, but it is preferable to be controlled to be in the range of 7 to 9.

In addition, the dissolved-oxygen-concentration adjusting means for maintaining the dissolved oxygen concentration at any places in the biological treatment tank 8 to 2 mg/L or higher is not be limited to the air feeding means as described in the above embodiments. For example, it is possible to use a mechanical aerator as described in the third embodiment, in addition to the air feedin means for feeding air simply via a pipe as described in the first and second embodiments. In this case, the number of the mechanical aerator to be installed or the required oxygen feed rate may be varied optionally in accordance with the decomposition rate, etc. of organic sulfur compounds.

Further, the passage 12 for supplying the water treated in the biological treatment tank again into the pH adjusment tank 2 is connected to the treated water tank 11 and the pH adjustment tank 2 in the first embodiment, and connected to the biological treatment tank 8 and the pH adjustment tank 2 in the second embodiment respectively. However, it may be connected in various forms. It is essential that a part of the water treated in the biological treatment tank 8 is returned to the pH adjustment tank 2.

In addition, types of water to be treated in the present invention are not limited to wastewater, sewage, etc., but any types of water may be employed, provided that it contains organic sulfur compounds.

This specification is by no means intended to restrict the present invention to the preferred embodiments set forth therein. Various modifications to the inventive method and apparatus for treating water containing organic sulfur compounds, as described herein, may be made by those skilled in the art without departing from the spirit and scope of the present invention.

What is claimed is:

1. A method for treating water containing organic sulfur compounds comprising: adjusting the pH value of said water in a pH adjustment tank, biologically treating the water in a biological treatment tank, adjusting the pH value of the water to be alkaline at any places in said biological treatment tank, maintaining the dissolved oxygen concentration of the water to 2 mg/L or higher at any places in said biological treatment tank, and recirculating a part of the water to the pH adjustment tank for a further treatment.

2. A method for treating water containing organic sulfur compounds according to claim 1, wherein the pH value of the water at any places in said biological treatment tank is in the range from 7 to 9.

3. An apparatus for treating water containing organic sulfur compounds comprising: a pH adjustment tank for adjusting the pH value of the water, a biological treatment tank for biologically treating the water after the pH adjustment, said biological treatment tank being provided with a pH adjusting means for adjusting the pH value of the water to be alkaline at any places in the biological treatment tank and a dissolved-oxygen-concentration adjusting means for maintaining the dissolved oxygen concentration of the water at any places in the biological treatment tank to 2 mg/L or higher, and a passage for recirculating a part of the water treated in said biological treatment tank to said pH adjustment tank.

4. An apparatus for treating water containing organic sulfur compounds according to claim 3, wherein said pH adjusting means provided in said biological treatment tank comprises a pH measuring instrument for measuring the pH value in the biological treatment tank or the pH value in said passage of the water discharged from the biological treatment tank, an alkali supplying means for supplying alkaline liquid to the biological treatment tank, and a controller for controlling the volume of the alkaline liquid supplied by said alkali supplying means in accordance with the pH value measured by said pH measuring instrument.

5. An apparatus for treating water containing organic sulfur compounds according to claim 3, wherein said dissolved-oxygen-concentration adjusting means provided in said biological treatment tank comprises an air feeding means for allowing air to flow into the biological treatment tank.

6. An apparatus for treating water containing organic sulfur compounds according to claim 3, wherein said dissolved-oxygen-concentration adjusting means provided in said biological treatment tank comprises a mechanical aerator for agitating the water in the biological treatment tank.

* * * * *

UNITED STATES PATENT AND TRADEMARK OFFICE
CERTIFICATE OF CORRECTION

PATENT NO. : 5,529,693
DATED : June 25, 1996
INVENTOR(S) : Takahiro YANO, et al.

It is certified that error appears in the above-indentified patent and that said Letters Patent is hereby corrected as shown below:

On the title page, Item [73], the First Assignee's name, should read:

-- [73] Sharp Kabushiki Kaisha --

Signed and Sealed this

Twenty-fourth Day of September, 1996

*Attest:*

BRUCE LEHMAN

*Attesting Officer*  *Commissioner of Patents and Trademarks*